3,409,645
NOVEL PROCESS FOR THE PREPARATION OF
GONA-1,3,5(10),8,13-PENTAENONES
Reinhardt P. Stein, Conshohocken, Herchel Smith, Wayne, and George C. Buzby, Jr., Philadelphia, Pa., assignors to American Home Products Corporation, New York, N.Y., a corporation of Delaware
No Drawing. Filed May 9, 1966, Ser. No. 548,409
4 Claims. (Cl. 260—397.45)

This invention relates to a new and novel process for the synthesis of gonapentaenones which are useful intermediates in the synthesis of therapeutically efficacious steroid compounds.

The compounds which may be synthesized by the process of the present invention are represented by the following formula:

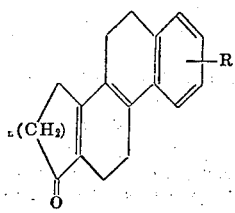

wherein R is selected from the group consisting of hydrogen, lower alkoxy and lower alkyl; and $n$ is an integer from 1 to 2. When the integer $n$ in the aforesaid structural formula is equal to two (2) the compounds prepared by the process of this invention are known as "D-homogonapentaenones." Typical examples thereof are: D-homo-3-methoxygona-1,3,5(10),8,13-pentaen-17a-one; D-homogona-1,3,5(10),8,13-pentaen-17a-one; and D-homo-1-ethylgona-1,3,5(10),8,13-pentaen-17a-one.

Alternatively, when the integer $n$ is equal to one (1), the compounds are called "gonapentaenones." Examples of these gonapentaenones are 3-methoxygona-1,3,5(10),-8,13-pentaen-17-one; 3-methylgona-1,3,5(10),8,13-pentaen-17-one; and 4-methoxygona-1,3,5(10),8,13-pentaen-17-one.

The process of this invention is exemplified by the following reaction:

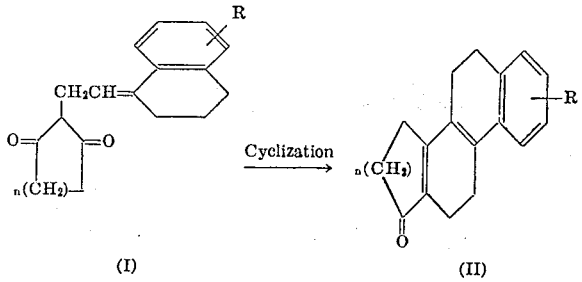

wherein R and $n$ are defined as above. The cyclization of an appropriate D-homo-8,14-secogonatetraendione (I) or 8,14-secogonatetraendione (I) is effected by reacting said compound with an excess of a mineral acid in a reaction-inert solvent for a period of about one-half hour to about two hours at about the reflux temperature of the reaction mixture. Prefreably this reaction is conducted in methanol with hydrochloric acid by refluxing the reaction mixture for about one and a half hours. After the reaction is complete, the corresponding D-homogonapentaenone (II) or gonapentaenone (II) is separated by conventional recovery procedures, such as, concentration, reconstitution with benzene, aqueous extraction to remove impurities, concentration and trituration with ether to afford a crystalline product (II). Alternate recovery procedures will be obvious to those skilled in the art of chemistry.

By reaction-inert solvent, as employed herein, is meant a solvent which dissolves the reactants and does not prevent their interaction. Alkanols have been found to be satisfactory solvents. The amount of reaction-inert solvent employed in this process is not critical, it being only necessary to use a sufficient amount of solvent to provide a reaction medium for the particular reactants. The term "mineral acid," as employed above, includes most inorganic acids and is exemplified by the following: hydrochloric, hydrobromic, hydroiodic and sulfuric acid.

The 8,14-secogonatetraendione starting compounds, including both the D-homo-8,14-secogona-1,3,5(10),9-(11)-tetraen-14,17a-diones and the 8,14-secogona-1,3,5-(10),9(11)-tetraen-14,17-diones, are alternatively known as 2-[2-(3,4-dihydro-1(2H)-naphthylidene)ethyl]cyclohexane-1,3-diones for the former and 2-[2-(3,4-dihydro-1(2H)-naphthylidene)ethyl]cyclopentane-1,3-diones for the latter. These starting compounds are prepared by the procedure described in copending and cofiled U.S. patent application "Novel Cyclopentapyranones and Benzopyranones," Ser. No. 548,406 by Stein, R. P.; Buzby, G. C. Jr.; and Smith, H. The mineral acids and reaction inert solvents employed in the process of this invention are readily available from commercial sources.

The following examples are given by way of illustration and are not to be construed as limitations of this invention, many variations of which are possible without departing from the scope and spirit thereof.

Example I

D-homo-3-methoxy-8,14-secogona-1,3,5(10),9(11)-tetraen-14,17a-dione (1 g.) is refluxed in methanol (30 ml.) containing 18% hydrochloric acid (10 ml.) for one and a half hours. The methanol is evaporated under reduced pressure and the residue dissolved in benzene. The benzene solution is washed with aqueous sodium bicarbonate, water, and brine, dried, and evaporated to afford a yellow oil. On trituration of this oil with ether, there is obtained D-homo-3-methoxygona-1,3,5(10),8,13-pentaen-17a-one, as yellow prismatic needles, (0.58 g.), M.P. 117–119° C.;

$\lambda_{max.}^{KBr}$ 6.12$\mu$ $\gamma$ max. (ethanol) 246 and 392 m$\mu$ (log $\epsilon$ 4.02 and 4.38).
Analysis.—Calcd. for $C_{19}H_{20}O_2$: C, 81.4; H, 7.2. Found: C, 81.2; H, 7.2.

Example II

D-homo-8,14-secogona-1,3,5(10),9(11)-tetraen-14,17a-dione (2.0 g.) is refluxed in ethanol (60 ml.) containing 30% hydrobromic acid (15 ml.) for two hours. The ethanol is evaporated under vacuum and the residue dissolved in toluene. The toluene solution is washed with aqueous potassium bicarbonate, water, brine, dried and evaporated to yield D-homo-gona-1,3,5(10),8,13-pentaen-17a-one.

Example III

D-homo-3-ethoxy-8,14-secogona-1,3,5(10),9(11)-tetraen-14,17a-dione (1.0 g.) is refluxed in methanol (30 ml.) containing 20% sulfuric acid (10 ml.) for one hour. The methanol is evaporated under vacuum and the residue dissolved in benzene. The benzene solution, is washed with aqueous 0.1 N potassium hydroxide, water, brine, dried and evaporated to yield D-homo-3-ethoxygona-1,3,5(10), 8,13-pentaen-17a-one.

In the same manner, D-homo-2-propylgona-1,3,5(10), 8,13-pentaen-17a-one is obtained.

Example IV 3-methoxy-8,14-secogona-1,3,5(10),9(11)-tetraen-14,17-dione (0.5 g.) is refluxed in butanol (15 ml.) containing 25% hydrochloric acid (5.0 ml.) for one and a half hours. The butanol is evaporated under vacuum and the residue dissolved in benzene. The benzene solution is washed with aqueous sodium bicarbonate, water, brine, dried and evaporated to yield 3-methoxygona-1,3,5(10), 8,13-pentaen-17-one.

Similarly, 3 - propoxy-8,14-secogona-1,3,5(10),9(11)-tetraen-14,17-dione is contacted with hydrobromic acid to form 3-propoxy-1,3,5(10),8,13-pentaen-17-one.

Example V

3 - methyl - 8,14 - secogona-1,3,5(10),9(11)-tetraen-14,17-dione (1.0 g.) is refluxed in methanol (30 ml.) containing 18% hydrochloric acid (10 ml.) for one half hour. The methanol is evaporated under vacuum and the residue dissolved in benzene. The benzene solution is washed with aqueous 0.1 N potassium hydroxide, water, brine, dried and evaporated to yield 3-methylgona-1,3,5(10),8,13-pentaen-17-one.

In the same manner, 2-ethylgona-1,3,5(10),8,13-pentaen-17-one is produced.

Example VI 8,14 - secogona - 1,3,5(10),9(11)-tetraen-14,17-dione (1.0 g.) is refluxed in propanol (30 ml.) containing 40% sulfuric acid (10 ml.) for one half hour. The propanol is evaporated under vacuum and the residue dissolved in xylene. The xylene solution is washed with aqueous sodium bicarbonate, water, brine, dried and evaporated to yield gona-1,3,5(10),8,13-pentaen-17-one.

What is claimed is:

1. A process for the production of a compound selected from the group consisting of those having the formula:

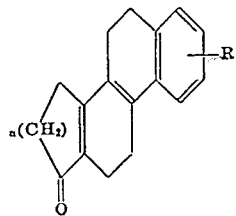

wherein R is selected from the group consisting of hydrogen, lower alkoxy and lower alkyl; and $n$ is an integer from 1 to 2, which comprises contacting a compound having the formula:

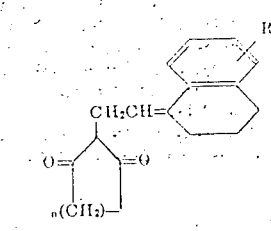

with a mineral acid, in a reaction-inert solvent, at about reflux temperatures for a period of about one half hour to about two hours.

2. A process as described in claim 1 wherein:
   (a) the mineral acid is hydrochloric acid;
   (b) the reaction-inert solvent is methanol; and
   (c) the reaction is conducted at the reflux temperature of the reaction mixture for about one and a half hours.

3. A process as described in claim 1 for the production of D-homo-3-methoxygona-1,3,5(10),8,13-pentaen-17a-one which comprises refluxing D-homo-3-methoxy-8,14 - secogona-1,3,5(10),9(11)-tetraen-14,17a-dione and hydrochloric acid in methanol for one and a half hours.

4. A process as described in claim 1 for the production of 3 - methoxygona - 1,3,5(10),8,13-pentaen-17-one which comprises refluxing 3-methoxy-8,14-secogona-1,3, 5(10),9(11)-tetraen-14,17-dione and hydrochloric acid in methanol for one and a half hours.

References Cited

UNITED STATES PATENTS 3,317,566    5/1967    Whitehurst et al.

H. A. FRENCH, *Primary Examiner.*